United States Patent
Pluimers

(10) Patent No.: US 11,525,561 B2
(45) Date of Patent: Dec. 13, 2022

(54) ANGLE ADJUSTMENT AND ROTATION ELEMENT

(71) Applicant: SCHREDER S.A., Brussels (BE)

(72) Inventor: Guy Pluimers, Awans (BE)

(73) Assignee: Schreder S.A., Brussels (BE)

( * ) Notice: Subject to any disclaimer, the term of this patent is extended or adjusted under 35 U.S.C. 154(b) by 94 days.

(21) Appl. No.: 17/059,335

(22) PCT Filed: May 28, 2019

(86) PCT No.: PCT/EP2019/063784
§ 371 (c)(1),
(2) Date: Nov. 27, 2020

(87) PCT Pub. No.: WO2019/229045
PCT Pub. Date: Dec. 5, 2019

(65) Prior Publication Data
US 2021/0148552 A1    May 20, 2021

(30) Foreign Application Priority Data

May 28, 2018 (BE) .................................... 2018/5343

(51) Int. Cl.
*F21V 21/14* (2006.01)
*F16M 11/12* (2006.01)
(Continued)

(52) U.S. Cl.
CPC ............ *F21V 21/14* (2013.01); *F16M 11/125* (2013.01); *F21V 21/26* (2013.01); *F16M 2200/024* (2013.01); *F21W 2131/10* (2013.01)

(58) Field of Classification Search
CPC ....... F21V 21/14; F21V 21/26; F16M 11/125; F16M 2200/024
See application file for complete search history.

(56) References Cited

U.S. PATENT DOCUMENTS 6,834,983 B1    12/2004  Guritz
10,228,103 B1 *  3/2019  Zhou .................... F21L 4/08
(Continued)

FOREIGN PATENT DOCUMENTS

CN    205664249 U    10/2016
DE    202009003239 U1    7/2009
(Continued)

OTHER PUBLICATIONS

International Search Report and Written Opinion of International Searching Authority, Application No. PCT/EP2019/063784, dated Jul. 1, 2019, 14 pages.

*Primary Examiner* — Bryon T Gyllstrom
*Assistant Examiner* — Christopher E Dunay
(74) *Attorney, Agent, or Firm* — McDonnell Boehnen Hulbert & Berghoff LLP

(57) ABSTRACT

An angle adjustment and rotation system comprising a first element attachable to a luminaire stand, and a second element configured to be attachable to a luminaire head, the first element and second element comprising substantially complementary shapes, and an attaching element configured to have a first state in which it tightly attaches the first element to the second element and a second state in which it movably attaches the first element to the second element. In the second state, the attaching element enables a rotation over substantially 180 degrees of the second element with respect to the first element. A method of controlling the orientation of a luminaire head connected to a luminaire stand is also proposed, preferably using the proposed system.

20 Claims, 6 Drawing Sheets

(51) Int. Cl.
*F21V 21/26* (2006.01)
*F21W 131/10* (2006.01)

(56) References Cited

U.S. PATENT DOCUMENTS

| | | | |
|---|---|---|---|
| 2014/0105670 A1* | 4/2014 | Plomteux | F16C 11/10 403/83 |
| 2016/0265756 A1* | 9/2016 | Silver | F21S 8/026 |
| 2018/0340644 A1* | 11/2018 | Bowman | F16M 11/2064 |
| 2019/0113072 A1* | 4/2019 | Chijoff | F16C 11/0609 |
| 2019/0234594 A1* | 8/2019 | Dinh | F21S 8/036 |
| 2019/0346121 A1* | 11/2019 | Zhu | F21S 8/00 |
| 2020/0141564 A1* | 5/2020 | Tsai | F21V 5/04 |
| 2020/0332828 A1* | 10/2020 | Thomas | F16M 11/125 |
| 2022/0120420 A1* | 4/2022 | Oláh | F16M 13/022 |

FOREIGN PATENT DOCUMENTS

| | | | |
|---|---|---|---|
| EP | 0652401 | A2 | 5/1995 |
| GB | 2494171 | A | 3/2013 |
| KR | 100977723 | B1 | 8/2010 |

\* cited by examiner

ANGLE ADJUSTMENT AND ROTATION ELEMENT

FIELD OF THE INVENTION

The invention lies in the field of angle adjustment systems and rotation systems for luminaire heads.

BACKGROUND

Luminaires, in particular outdoor luminaires, usually consist of a luminaire stand of some sort—often, but not always, a luminaire pole—and a luminaire head, which comprises the main lighting elements. In some cases, the stand and the head are manufactured together. However, a disadvantage of this is that it does not allow for customization according to, for instance, the location or intended use of a luminaire.

Systems are known which aim to resolve this issue by manufacturing the luminaire stand and the luminaire head separately, and by providing some sort of system which allows the luminaire head to be affixed to the luminaire stand along various orientations, for instance a rotation system or an angle adjustment system. The orientation may then be adjusted, either during the manufacturing process or during the installation process of the luminaire.

Known systems, however, still tend to have disadvantages. These may for instance be at least one of: a limited range of orientations, an undesirable lack of precision, a lack of ease (in particular related to the fact that luminaire heads may be quite heavy) of moving the luminaire head from one orientation to another and/or of allowing for an adjustment, an undesirable degree of complexity, etc.

The invention aims to provide an angle adjustment and rotation system, specifically suitable for attaching a luminaire head to a luminaire stand, which allows for a luminaire head to be adjusted with ease to a variety of different orientations while still allowing for a high degree of precision, and which is not unnecessarily complex.

SUMMARY

This aim is achieved by an angle adjustment and rotation system comprising a first element, a second element, and an attaching element. The first element comprises a first section configured to be attachable to a luminaire stand, said first section being elongated along a first axis, as well as a second section which is substantially straight along a first direction and which has a cross-section in a plane perpendicular to the first direction with a substantially concave inner surface. The second element is configured to be attachable to a luminaire head, and its outer surface is substantially straight along the first direction and has a cross-section in a plane perpendicular to the first direction with a substantially convex outer surface.

The attaching element, which attaches the first element to the second element, is configured to have at least a first state in which it tightly attaches the first element to the second element and a second state in which it movably attaches the first element to the second element. The inner surface of the second section of the first element and the outer surface of the second element are configured such that they are substantially complementary in at least a first and a second position of the second element with respect to the first element, when the attaching element is in the first state. In the second position the second element is substantially rotated by 180 degrees with respect to the first element as compared to the first position, along a second axis, wherein this second axis is perpendicular to the first direction. The attaching element is configured such that its second state enables a rotation over substantially 180 degrees of the second element with respect to the first element, substantially along the second axis.

Note that while the rotation is a rotation over substantially 180 degrees, it preferably takes place along an axis which is not along the first axis of the first section of the first element, which means that a difference between the orientation of the luminaire head in the first position, along a first angle with respect to the first axis, and the orientation of the luminaire head in the second position, along a second angle with respect to the first axis, need not be 180 degrees. In other words: if you consider the orientation of the luminaire head to be represented by an axis along the main or average direction in which it emits light when switched on, the angle between this axis in the first position (hereafter: the first lighting axis) and this axis in the second position (hereafter: the second lighting axis) need not be 180 degrees. In fact, in advantageous embodiments, the second axis is oriented at an angle of between 35 and 55 degrees with respect to the first axis, and as a result the first angle and the second angle (or: the first lighting axis and the second lighting axis) are different by between 70 and 110 degrees, for instance by about 90 degrees. This allows for the luminaire head to be oriented, once the luminaire is fully assembled and installed, such that it is substantially in line with or substantially perpendicular to a luminaire pole, for instance, and even for this orientation to be changed in situ without having to replace any parts. The complimentary surfaces, which are straight along the first direction but concave and convex respectively in a cross-section in a perpendicular plane, ensure that when the attaching element is in its first state and the first element and second element are fitted closely together, the resulting fixation may be quite strong, because rotation along the second axis is impeded by the shape of the elements.

Note that "degree", throughout the specification, refers to 1/360th of a full arc. Therefore, 180 degrees is equivalent to $\pi$ radians, 90 degrees is equivalent to $\pi/2$ radians, 45 degrees is equivalent to $\pi/4$ radians, and so on.

In advantageous embodiments, the attaching element is a longitudinal element, and the longitudinal axis of the attaching element substantially coincides with the second axis. This attaching element may for instance consist of a central bolt. "Central", here, should be taken to mean that the bolt is oriented substantially along a plane which comprises both the first and the second axis. In many cases, this will entail that the bolt is located at substantially equal distances from the outside edges of the first and/or second element along the first direction.

This means that the rotation of the second element is a rotation around the bolt, which can happen without the bolt needing to be removed: it is sufficient to loosen the bolt such that the distance between the first and second element increases to such an extent that rotation becomes possible. Furthermore, the simplicity of this attaching element, in combination with the complementary shapes of the first and second element, entails that the claimed system may be quite simple and cost-efficient to manufacture. The use of a central bolt also means that only a single element needs to be loosened to allow rotation of the luminaire head.

Preferably the bolt is positioned such that its head is accessible from the outer surface of the first element. This allows a person who wants to rotate the luminaire head to easily move the attaching element from its first to its second state and vice versa. Even more preferably, the bolt is associated with a nut, and the second element is configured such that when the bolt is in the first position or in the second position the nut is prevented from rotating. The skilled person will be familiar with various ways of enabling this: nuts which have at least two straight sides, for instance, may easily be made "captive" between for instance walls in the second element. Such a configuration enables the attaching element to be moved from its first to its second state and vice versa one-handedly, with a simple screwdriver or another simple suitable tool.

An advantageous way of configuring the claimed system for use with such a central bolt is as follows. The first section of the first element comprises a first opening, preferably shaped such that it has a circular diameter when seen along the length axis of the bolt, with a diameter preferably substantially equal to or slightly larger than the diameter of the head of the bolt. The second section of the first element comprises a second opening, preferably of circular shape with a diameter substantially equal to or slightly larger than the diameter of the bolt but smaller than the head of the bolt. And the second element comprises a third opening suitable for passage of the bolt. Clearly, the dimensions of the third opening in particular should not be too large, since it should not allow for passage of the nut associated with the bolt. In this configuration, the bolt passes through the first and second elements, may be easily accessible, and may tightly attach the first element to the second element in the second state. In an alternative embodiment, the bolt may be arranged with the head end in the third opening, and the bolt in the first opening. The skilled person understands that the dimensions of the first, second and third opening may then be adjusted accordingly.

The third opening may be shaped such that it enables displacement of the bolt in the third opening along only one direction, wherein this direction is preferably perpendicular to the first direction. This allows for more than just two possible orientations, because there is some freedom to adjust the orientation of the second element with respect to the first element. If the displacement of the bolt is indeed along a direction perpendicular to the first direction, this adjustment would be an adjustment similar or equivalent to a rotation along an axis parallel to the first direction. Such displacement may for instance be enabled if the third opening has an elongated shape with its longitudinal axis along the direction perpendicular to the first direction, for instance a shape wherein the width perpendicular to the longitudinal axis is preferably constant over a substantial part of the length, wherein more preferably the ends of the shape are curved. This shape is sometimes referred to as "oval", despite not being ovoid or mathematically elliptical.

Note that while the above refers repeatedly to embodiments which use a central bolt, there are of course other possibilities for the attaching element. For instance, the use of an attaching element with a degree of elasticity, such as a spring, may lead to embodiments which have increased ease of use. Such an attaching element should then be configured such that it biases the system towards the first state, i.e. that it generally pulls the first and second elements together into the first state. The spring force is preferably configured such that a user may pull the first and second element apart, thus moving the system towards the second state wherein the second element may be rotated with respect to the first element along the second axis for orientation, and potentially towards the third state for additional adjustments along the third axis.

In embodiments, at least a part of the inner surface of the second section of the first element and/or at least a part of the outer surface of the second element is provided with a friction enhancing structure. This enhances the fixation of the first element to the second element (and hence of the luminaire stand to the luminaire head) in the first state of the attaching element.

In advantageous embodiments, at least a part of the inner surface of the second section of the first element and at least a part of the outer surface of the second element are provided with teeth. These teeth are configured such that in the first state of the attaching element, the teeth of the inner surface of the second section of the first element and the teeth of the outer surface of the second element engage with each other, wherein the teeth are preferably reflection symmetric along respective planes parallel to the first direction. This symmetry enables the teeth to be complementary in shape to each other in both the first and the second position of the second element with respect to the first element.

As discussed previously, it is desirable to allow for more than just two positions, by enabling adjustments in both the first and the second position of the second element with respect to the first element. Therefore, in advantageous embodiments, the attaching element is configured to further have a third state, in between the first and second states, in which a rotation of the second element with respect to the first element along a third axis, which is parallel to the first direction, is enabled over an angle of less than 45 degrees, preferably of less than 35 degrees, more preferably of less than 25 degrees. While such adjustments are also possible in the second state of the attaching element, the adjustments may be more easily performed in a third state, in which the first and second elements are closer to each other, thus preventing rotation along the second axis due to their shape but enabling rotation along the third axis.

If this embodiment is provided with teeth as described previously, the size, shape and position of the teeth are preferably chosen such that they allow the fixation of the first element to the second element in the first state of the attaching element in a plurality of positions, wherein two adjacent positions are rotated along the third axis over an angle of less than 5 degrees, preferably less than 3 degrees, more preferably less than 2.5 degrees.

This level of precision may be achievable because the present invention does not require rotation to be possible along the third axis over more than 45 degrees, due to the possibility of rotation over substantially 180 degrees along the second axis; therefore, there is no need for the second element to be shaped substantially like a cylinder. As a result, the global curvature of the convex outer surface of the second element and the concave inner surface of the second section of the first element may be less strong, and the teeth need not be very small to allow for an adjustment over a relatively small angle.

To assist a person in adjusting the orientation of a luminaire head more precisely, the outer side of the second element may be provided with visual indications of the possible angular orientations with respect to the first direction.

The first axis is preferably perpendicular to the first direction. The first and/or the second element are preferably substantially reflection symmetric with respect to a plane perpendicular to the first direction and/or to the plane comprising the first and second axis. In these types of configurations, the distribution of forces may be more balanced.

The substantially concave inner surface of the second section of the first element may be a curved surface, and the substantially convex outer surface of the second element is then a complementary curved surface. This may allow more ease of rotation than shapes which have surfaces with plane segments and thus angles. For instance, the second section of the first element may be substantially shaped like a section of a hollow cylinder. The second element then has a corresponding outer surface.

The first section of the first element may be cylindrical in shape, for instance when the luminaire stand is cylindrical or prismatic in shape. However, the shape of the first element is mostly chosen according to the luminaire stands that it should be attachable too, and in many cases is not significantly impacted by the considerations underlying the invention.

Luminaires tend to be connected to the electrical network. Even in cases when they are not, it is often important to assure an electrical connection between the luminaire stand and the luminaire head. Therefore, the system of the invention is preferably configured to accommodate such an electrical connection, for instance in the shape of a cable. Accordingly, the first section of the first element may be substantially hollow and the second section of the first element may have at least one opening, such as to allow for the passage of a cable. Note that this opening is in most cases a different opening than the first and second openings described previously. Accordingly, the second element may be configured to allow the passage of a cable exiting the opening in the second section of the first element, preferably in all positions of the second element with respect to the first element, such as to allow a cable to run from the luminaire stand to which the first element is to be attached to a luminaire head to which the second element is to be attached.

The second element comprises side walls which are each substantially oriented in a plane perpendicular to the first direction. These side walls may each be shaped like a section of a disc. More generally, the first and second element are preferably configured such that when the luminaire head and luminaire stand are attached to each other using the system of the invention, and when the attaching element is in the first state tightly attaching the first element to the second element, the assembled luminaire head is substantially closed, such as to substantially shield and/or seal inner parts—such as a cable—from the environment. However, this is not necessary for the functioning of the invention.

According to a further developed embodiment a secondary attaching element may be provided to further secure the attachment of the luminaire head to the luminaire stand. The secondary attaching element may be provided between the luminaire head or the first element attached to the luminaire head, and the luminaire stand or the second element attached to the luminaire stand. The secondary attaching element may prevent the luminaire head from falling in case of failure of the attaching element.

In exemplary embodiments, the secondary attaching element may be a lanyard having a predetermined length tied or fixed to the luminaire head or to the first element, and tied or fixed to the luminaire stand, e.g. to an arm of the luminaire stand, e.g. via a choke loop, or to an additional bracket integrated in the second element, or tied or fixed to the second element. In another exemplary embodiment, the second attaching element may be a bolt passing through a section of the first element and a section of the second element, and fastening together the first and second elements. In yet another exemplary embodiment, the secondary attaching element may be a wire spring clip configured for being clipped to the first or the second element in a mounted position and for retaining the second element to the first element. The wire spring clip may go from one side of the second element, over the first element, and to the opposite side of the second element. The skilled person will understand that the secondary attaching element may be implemented in various manners allowing the luminaire head and the luminaire stand to remain attached, in case of failure of the attaching element for example, and/or to further secure the positioning of the luminaire head respective to the luminaire stand. In yet another embodiment, where the attaching element comprises a bolt and a nut, the second attaching means may be a secondary nut acting as counternut, as is further explained below.

The invention further relates to a luminaire wherein the luminaire head is attached to the luminaire stand via an angle adjustment and rotation system as described above.

The invention further relates to a method of controlling an orientation of a luminaire head connected to a luminaire stand with an angle adjustment and rotation system as described above, comprising rotating the second element with respect to the first element to one of the first position and the second position in order to control the orientation of the luminaire head. Note that this method may be used both in luminaires which are already installed, and as part of an installation process for a new luminaire. In the latter case, the luminaire stand and the luminaire head may be provided having already been attached to the first and second element respectively, but the angle adjustment and rotation system may also be provided in an assembled state, wherein the luminaire stand and luminaire head are attached to the system as part of the installation process.

This method preferably also comprises, after the rotation, moving the first element and the second element closer together such that further rotation is impeded.

The invention also relates more generally to a method of controlling an orientation of a luminaire head connected to a luminaire stand, wherein a first element is attached to the luminaire stand, a second element is attached to the luminaire head, and an attaching element attaches the first element to the second element, said method comprising rotating the luminaire head with respect to the luminaire stand from a first position to a second position whilst the first element remains attached with the attaching element to the second element, wherein in the second position the second element is substantially rotated by 180 degrees with respect to the first element as compared to the first position.

Here, the first element, the second element and the attaching element may be elements as described before, but the method is not limited thereto. This method may be performed as part of the installation process of a luminaire, but also allows for changing an orientation of a luminaire head with respect to a luminaire stand in an already installed luminaire.

The rotation may be a rotation about a rotation axis which coincides with a symmetry plane of the luminaire, and/or a rotation axis which substantially coincides with an orientation of the attaching element, preferably an orientation of an longitudinal axis of the attaching element.

In an embodiment, the attaching element may comprise male and female portions, e.g. bolt and nut, configured to be fastened to each other. It may also be noted that the method may be performed in such a way that before substantially rotating the luminaire head with respect to the luminaire stand from the first position to the second position, the attaching element may be loosened from tightly attaching the first and second element in the first position such that the first element and the second element are movably attached.

In this manner, the number of element that may be detached from the luminaire head is decreased.

Additionally, the method may be performed in such a way that after rotating the luminaire head with respect to the luminaire stand from the first position to the second position, the attaching element may be tightened for tightly attaching the first element and the second element in the second position. In this manner, the attaching element secures the positioning of the first and second elements. According to a further embodiment, the nut fastening to the bolt may be supplemented with a second nut behind said nut, said second nut acting as a counter-nut to further secure the attachment of the first element to the second element via the attaching element.

The method may further comprise moving the second element at least a first distance away from first element prior to the rotation, wherein the rotation of the luminaire head with respect to the luminaire stand is only possible if the first element and second element are separated by at least this first distance, and moving the second element closer to the first element subsequent to the rotation, such that the distance between the second element and the first element is smaller than the first distance. This allows for the orientation of the luminaire head to be fixed after a desired orientation is achieved using the above-described method.

The method may further comprise a step of further adjusting the orientation of the luminaire head with respect to the luminaire stand by rotating it along an adjustment axis which is perpendicular to the rotation axis, until its orientation is within a certain angle of a desired orientation, wherein preferably this angle is less than 2.5 degrees, preferably less than 1.5 degrees, more preferably less than 1.25 degrees.

This allows for an advantageous level of configurability of the orientation of a luminaire head.

The adjusting of the orientation of the luminaire head is preferably performed when the first element and the second element are separated by at least a second distance, wherein the adjustment is only possible when the first element and the second element are separated by at least this second distance and wherein the second distance is smaller than or equal to the first distance, and further comprises moving the second element closer to the first element subsequent to the adjustment step, such that the distance between the second element and the first element is smaller than the second distance.

This allows for the orientation of the luminaire head to be fixed after a desired orientation is achieved using the above-described method.

An inner surface of the first element and an outer surface of the second element may be configured such that they are substantially complementary in at least the first and the second positions of the second element with respect to the first element when the attaching element tightly attaches the first element and the second element. At least a part of the complementary inner surface of the first element and at least a part of the complementary outer surface of the second element may be provided with teeth. The method may then further comprise a step of engaging in the second position the teeth of the at least part of the complementary inner surface of the first element and the teeth of the at least part of the complementary outer surface of the second element to simultaneously fix the orientation of the luminaire head with respect to the luminaire stand and fix the second position of the second element with respect to the first element.

It is to be noted that, the at least part of the inner surface of the first element and the outer surface of the second element being configured to be substantially complementary in at least the first and the second positions of the second element with respect to the first element, this engaging step of the method may also be performed after rotating the luminaire head with respect to the luminaire stand from the second position to the first position, and orienting the luminaire head with respect to the luminaire stand.

This allows for the orientation and the position of the luminaire head with respect to the luminaire stand to be fixed at the same time in one step.

A notable advantage of the above-described method is the ease of adjustment and rotation of a luminaire head both during and after installation of the (sometimes heavy) luminaire head.

Preferably, in the above-described method, the attaching element is a bolt, and moving the attaching element from one position to another is achieved by turning the bolt either clockwise or counterclockwise.

BRIEF DESCRIPTION OF THE FIGURES

The invention will be described further with reference to the figures, wherein.

DETAILED DESCRIPTION OF THE FIGURES

In the figures, like reference numbers are used for like elements. Note that none of the figures show the luminaire stand or the luminaire head, nor do they show in detail the means for attaching the first element to the luminaire stand and the second element to the luminaire head. This does not mean that these means should not be present; however, these elements will vary widely depending on the chosen luminaire stand and the chosen luminaire head, and the skilled person will be aware of various means of configuring the first and second element such that they are compatible with and attachable to the chosen luminaire stand and head, respectively.

Figure 1:
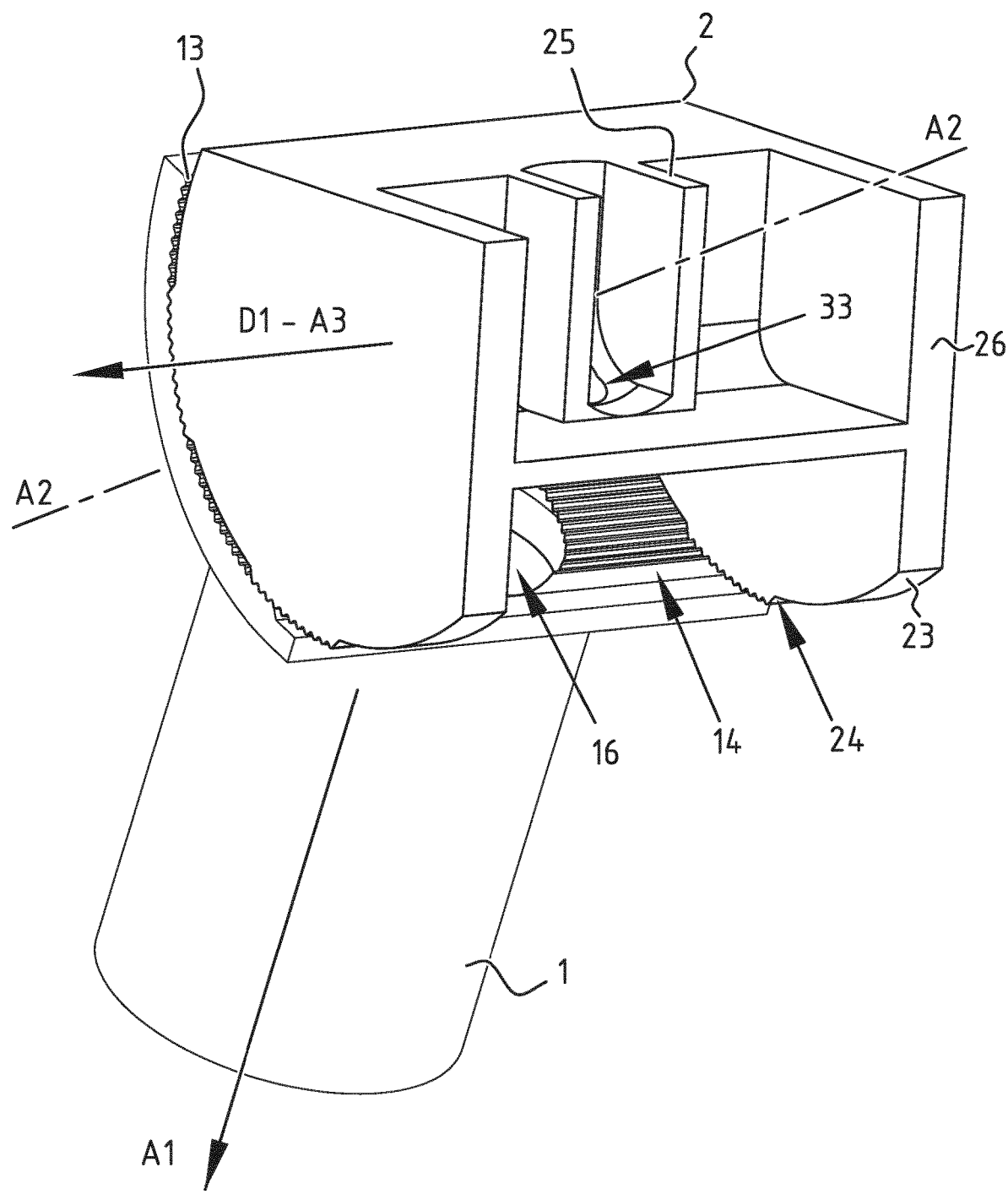
FIG. 1 shows an embodiment of the system according to the invention in a perspective view.

In FIG. 1, one perspective view is shown of an example embodiment of the present invention. Note that while the figures are limited to this type of embodiment, many of the features may be varied, and these figures should not be seen as limitative; the scope of the invention should be determined by the claims and not the figures.

This figure shows the embodiment in the first state of the attaching element, wherein the first and second elements are tightly fitted to each other. Note that these figures omit the attaching element, for reasons of clarity. First element 1, which is comprised of a first section 11 and a second section 12, is in the back. Second section 12 is shaped like a section of a hollow cylinder provided with teeth 14 on its concave inner surface 13, wherein the longitudinal axis of the hypothetical cylinder extends along a first direction D1. Note that while in the shown embodiment the teeth extend over the entire inner surface 13, it will be clear to the skilled person that this is not necessary: only teeth provided on the parts of inner surface 13 which need to engage with the second element in some of the possible orientations improve the precise fixation of the two elements to each other in an advantageous way. First section 11 of first element 1, which has the first axis A1 as its longitudinal axis, is hollow, and a cable may pass through it and then through opening 16.

Second element 2 has an outer surface 23 which is substantially complementary to inner surface 13. Note that this figure shows that the two elements do not need to be fully complementary: outer surface 23 is provided with fewer teeth than the teeth 14 on inner surface 13. Therefore, the term "substantially complementary" in the claims should not be interpreted too limitatively: the overall concaveness and convexness of the surface should be complementary, but the surfaces need not be complementary in every detail, as seen in this figure. However, in exemplary embodiments, the surfaces may be fully complementary.

Second element 2 is further provided with side walls 26, wherein outer surface 23 is a surface of these side walls, and with further walls 25 which are configured such that, when a bolt is inserted from the side of first element 1 and a nut is coupled to it on the side of second element 2, the nut may be prevented from rotating between walls 25. Opening 33, which corresponds to the third opening mentioned in the summary and the claims, is where the threaded end of such an inserted bolt would exit. Axis A3, which is the axis along which second element 2 may be rotated with respect to first element 1, can be seen to be oriented along first direction D1.

Figure 2:
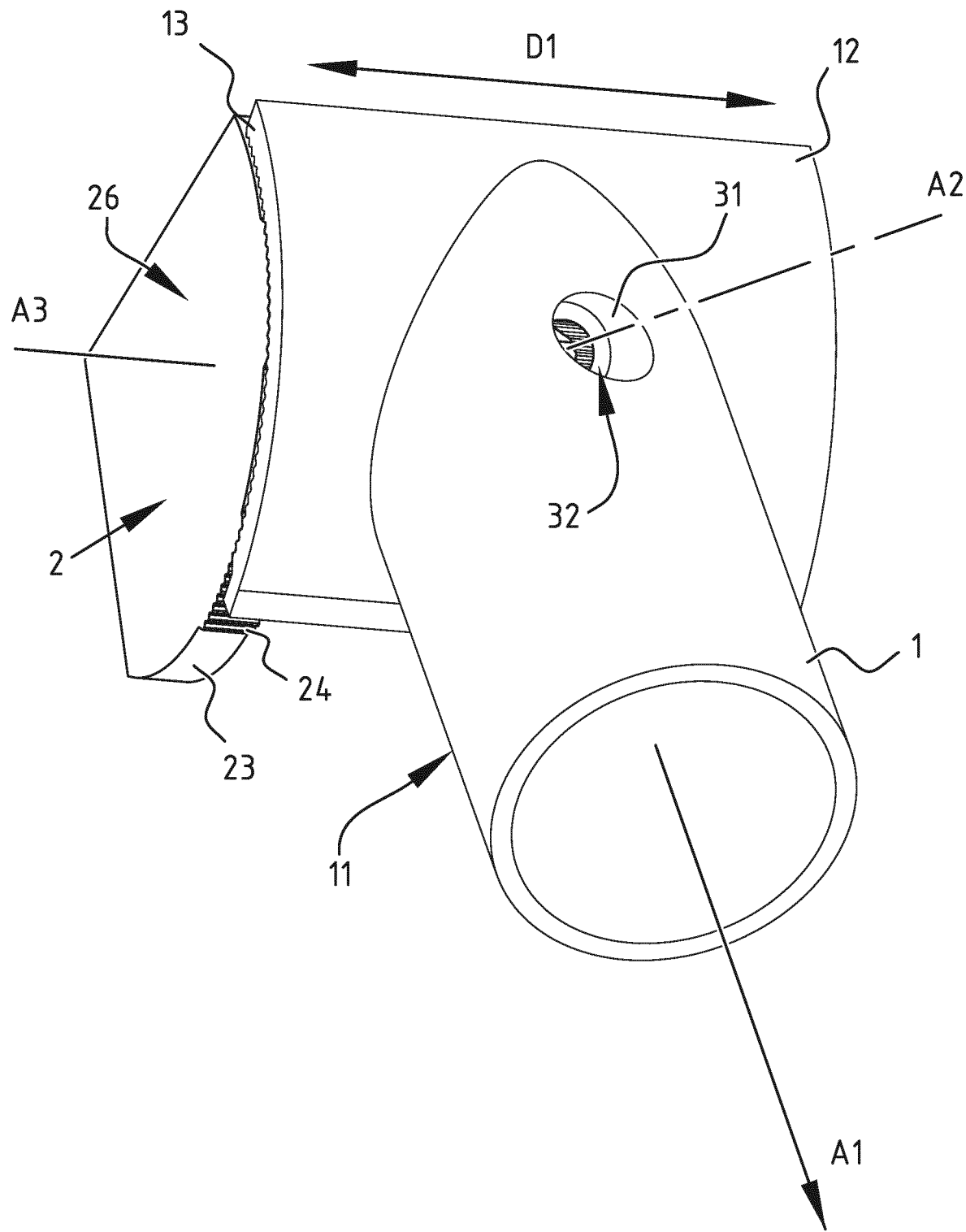
FIG. 2 shows this embodiment of the system from another angle.

FIG. 2 shows the same embodiment from a different angle. This angle shows first element 1 more clearly, in particular that its first section 11 is hollow along longitudinal axis A1, and the shape of first opening 31 and second opening 32. First opening 31 allows for the insertion of the bolt along an angle, which may allow for easy access, and can be configured such that in the first state the bolt head does not extend beyond the surface of first section 11. In those cases, first opening 31 should be sufficiently large as to allow for passage of the bolt head, whereas second opening 32 should be sufficiently large as to allow for passage of the bolt but not of the bolt head.

In the figure, Axis A2 is also depicted, as being an axis which extends through the openings 31, 32, 33. To be more precise, Axis A2 extends along the longitudinal axis of the attaching element which may be inserted through the openings 31, 32, 33, and this axis is in the shown embodiments perpendicular to first direction D1.

A secondary attaching element (not shown) may be provided to the first element 1 and the second element 2. In an exemplary embodiment, the secondary attaching element may comprise a bolt or a secondary nut acting as counter-nut. The second element 2 may comprise a secondary opening (not shown) in a plane comprising axes A1 and A2 in a mounted position of the first and second elements 1, 2. The first element 1 may comprise a corresponding secondary opening (not shown) in a similar plane. The bolt comprised in the secondary attaching element may pass through the secondary opening of the second element 2, through the corresponding secondary opening of the first element 1, and may be fastened to a nut, for example, to further secure the attachment of the first and second elements 1, 2.

Additionally or alternatively, the secondary attaching element may comprise a wire spring clip configured for being clipped to the first element 1 or the second element 2 in a mounted position, and for retaining the second element 2 to the first element 1. In an exemplary embodiment, the wire spring clip may have one end inserted in the side wall 26 of the second element 2, extend over the second section 12 of the first element 1, and have its other end inserted in the opposite side wall 26 of the second element 2. In this manner, the teeth 14 of the first element and the teeth 24 of the second element 1 may remain engaged through the action of the wire spring clip.

Note also that the secondary attaching element may comprise a lanyard fixed to the first and second elements 1, 2, said lanyard having a predetermined length in order to prevent the falling of the luminaire head from the luminaire stand in case of failure of the attaching element.

The skilled person will be aware of various means of configuring the secondary attaching element with respect to the first and second elements and/or the luminaire head and the luminaire stand such that it is compatible with the angle adjustment and rotation system in order to further secure the attachment of the chosen luminaire stand and head, respectively.

Figure 3:
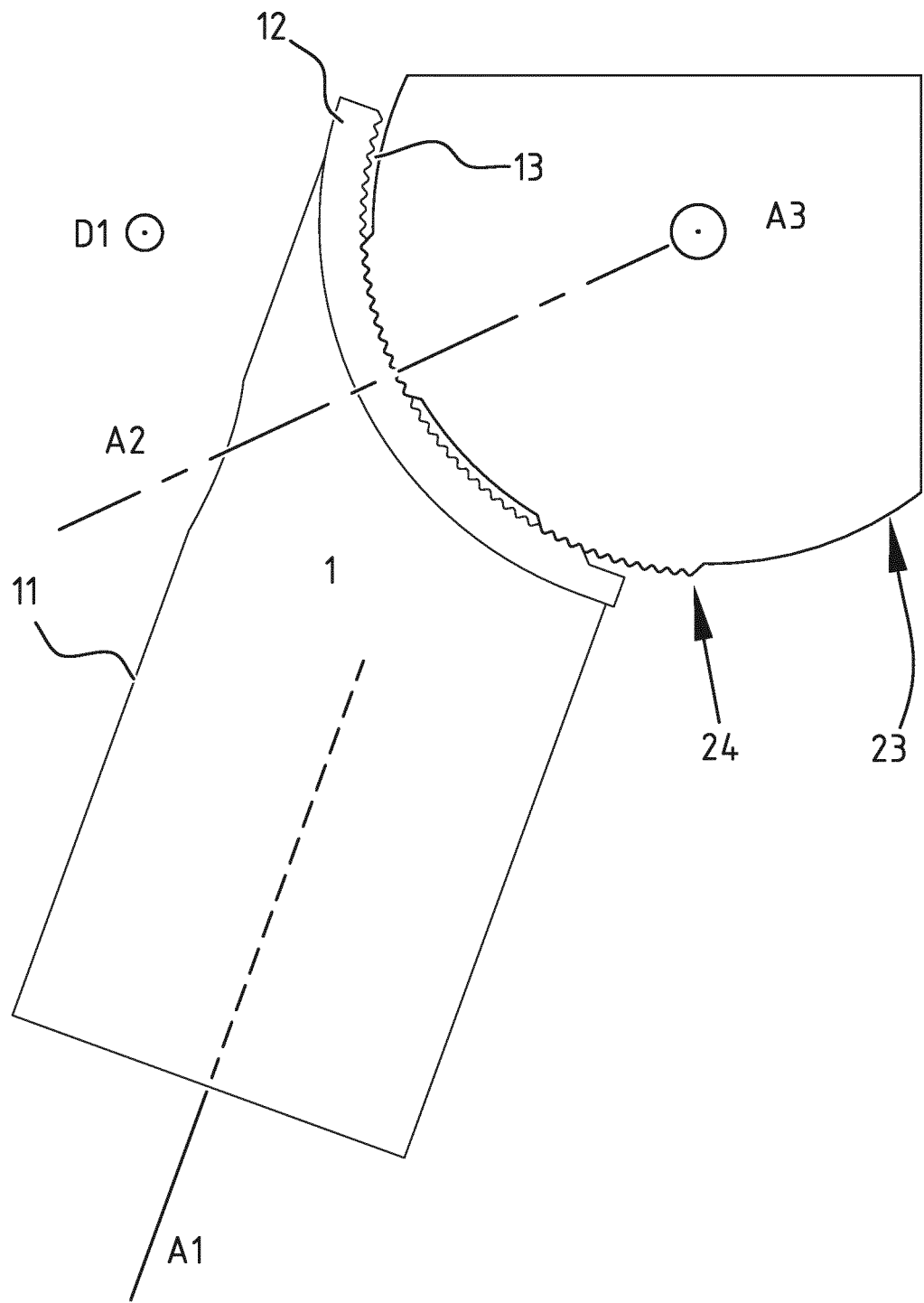
FIG. 3 shows this embodiment from the side.

FIG. 3 shows a side view. Here, again, it may be seen that inner surface 13 of second section 12 of first element 1 and outer surface 23 of second element 2 are substantially but not fully complementary. In the shown embodiment this is because inner surface 13 has more teeth than outer surface 23, but other difference are also possible and should be understood to be within the scope of the wording "substantially complementary".

Figure 4A:
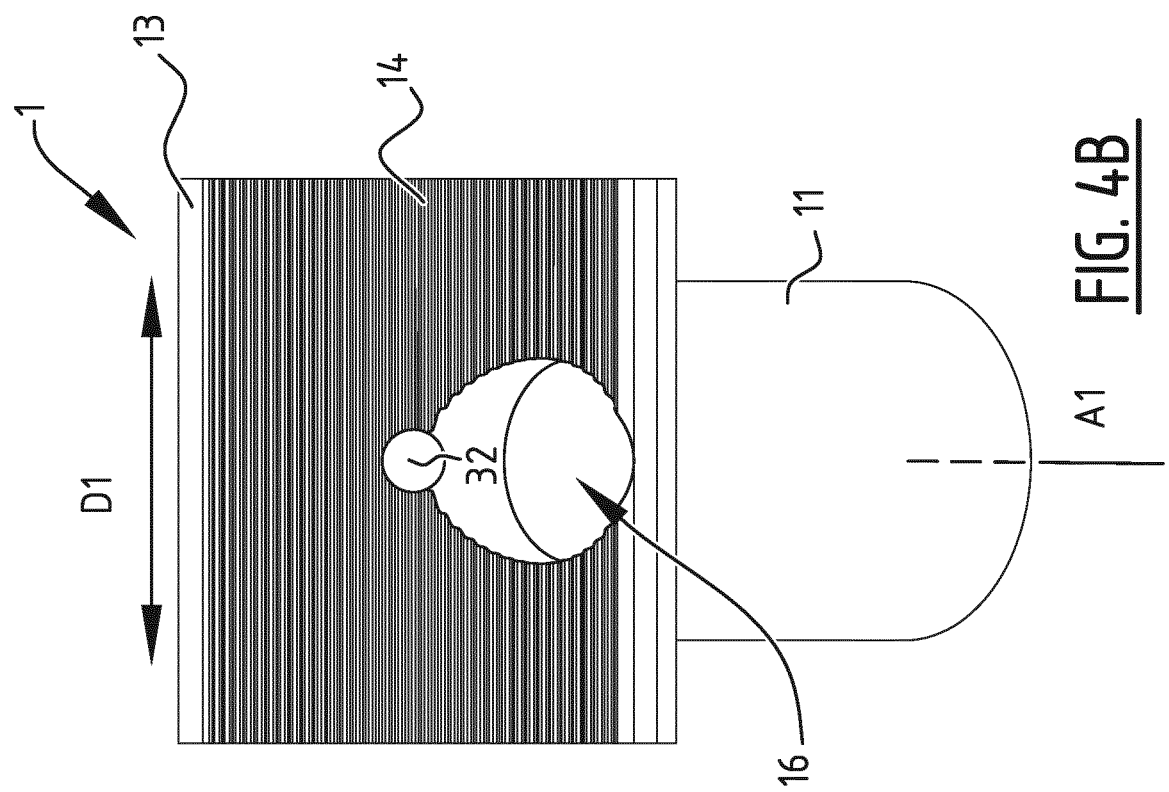
FIGS. 4A and 4B show the first element in an embodiment of the system according to the invention from two different angles.
Figure 4B:
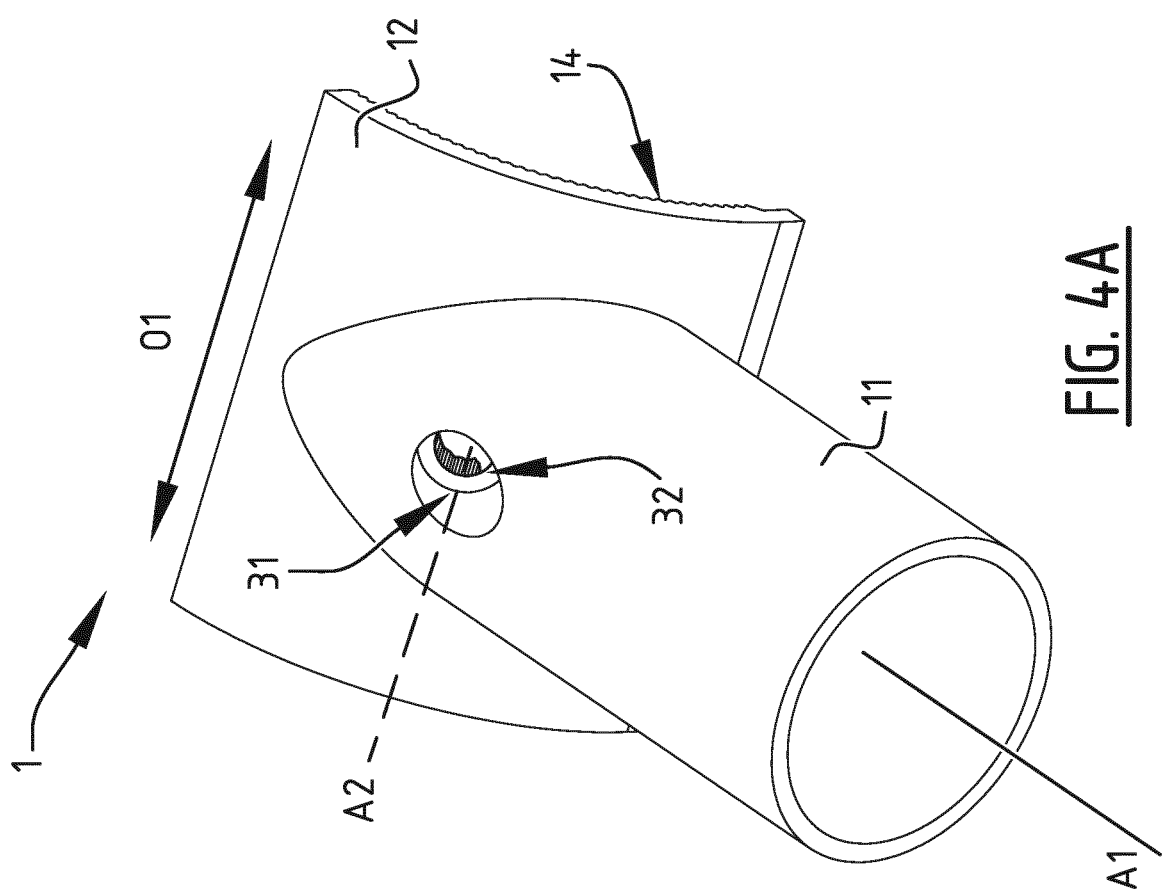

FIGS. 4A and 4B show only first element 1 with its first section 11 and second section 12. FIG. 4A shows first section 11 in particular: its hollowness along longitudinal axis A1, as well as the shape of first opening 31 and second opening 32. Axis A2, which is the axis which extends along the longitudinal axis of an inserted attaching element, is also shown, as is the orientation of first direction D1 along the straight part of second section 12. Teeth 14 may also be seen.

FIG. 4B shows the inner surface of second section 12 of first element 1 in more detail. As mentioned before, while in this embodiment teeth 14 extend over the entire inner surface 13, the skilled person will realize that this is not necessary for proper functioning of the invention. Opening 16 is the opening through which a cable may be inserted, such that electrical connections are made possible between luminaire stand and luminaire head. This figure shows more precisely that second opening 32 is a round opening: it is advantageous if the attaching element is kept in place by this opening.

Figure 5B:
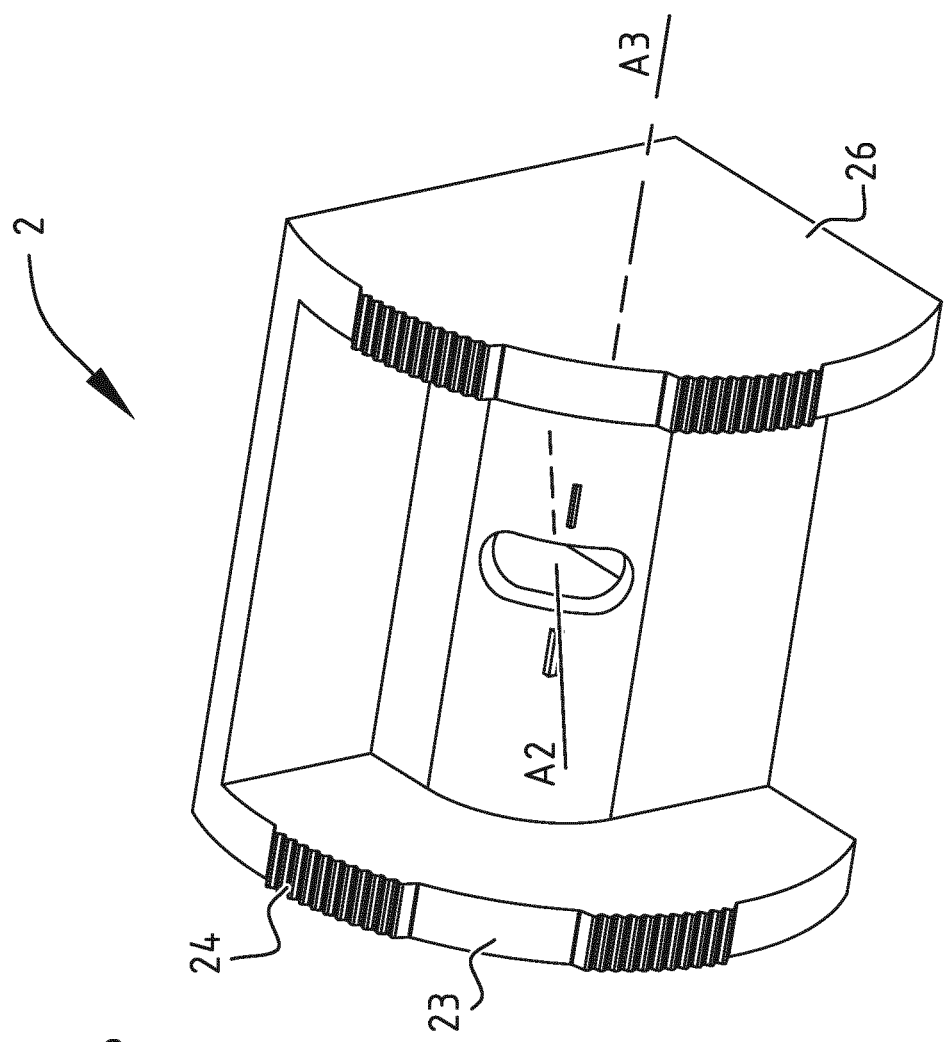
FIGS. 5A and 5B show the second element of this embodiment from two different angles.
Figure 5A:
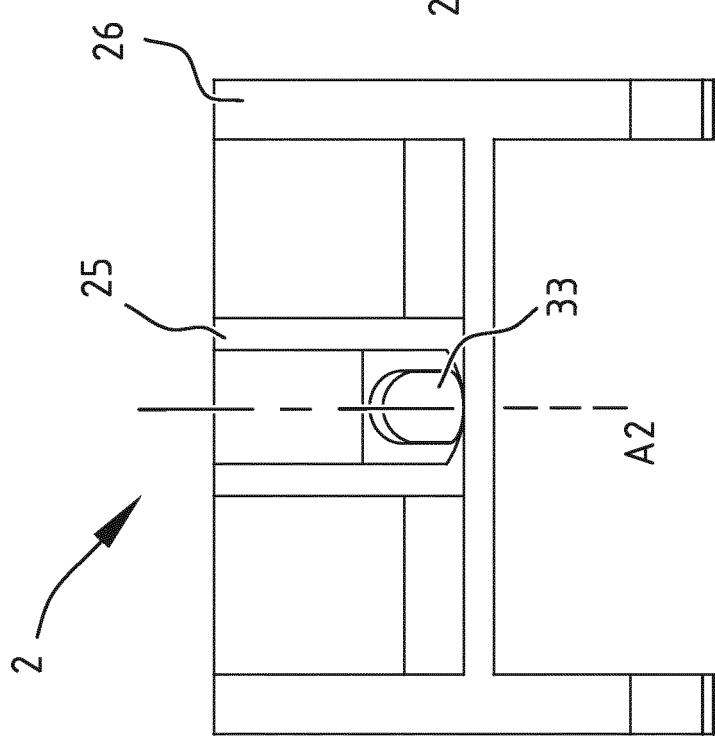

FIGS. 5A and 5B show only second element 2, from two different angles. The head-on view of FIG. 5A shows side walls 26 as well as the walls 25 which are configured to prevent a nut associated with a bolt inserting in turn through openings 31, 32, 33 from rotating, thus allowing loosening and fastening of the bolt without needing to worry about keeping the nut in place.

FIG. 5B shows second element 2 from another viewpoint, specifically showing the side which cannot be seen well once second element 2 is combined with first element 1. Together, these two figures show third opening 33 in more detail: its shape is what is often called "oval", with straight walls and rounded extremities. This shape allows an attaching element to move along only one direction, while also allowing the attaching element to change slightly in orientation. It is this shape 33 which, in this embodiment, allows for the smaller adjustments by rotation along third axis A3.

One advantage of this configuration is that axis A3 is not a physical axle, and does not require any kind of shaft or the like. Many existing systems do enable rotation with a physical axle, and therefore require a second element 2 which has side walls shaped substantially like a first circle, and a corresponding outer surface with a higher curvature (since a very large second element is undesirable). In these embodiments, it may be difficult to achieve precise adjustments, since the required teeth would then need to be so small that they no longer achieve the required fixation. Therefore, the construction proposed in the present specification, wherein the smaller adjustments along third axis A3 are made possible with an attaching element which has a longitudinal axis A2 which is perpendicular to A3, allows for the use of an outer surface with a lesser curvature, and therefore allows for higher precision without sacrificing proper fixation. The drawback is, of course, that the range of adjustments is smaller; however, this is compensated for with the possibility of an additional rotation over 180 degrees around second axis A2, which functionally doubles the amount of possible orientations. Note however that if a small range of orientations is sufficient, this second rotation need not be used.

Figure 6:
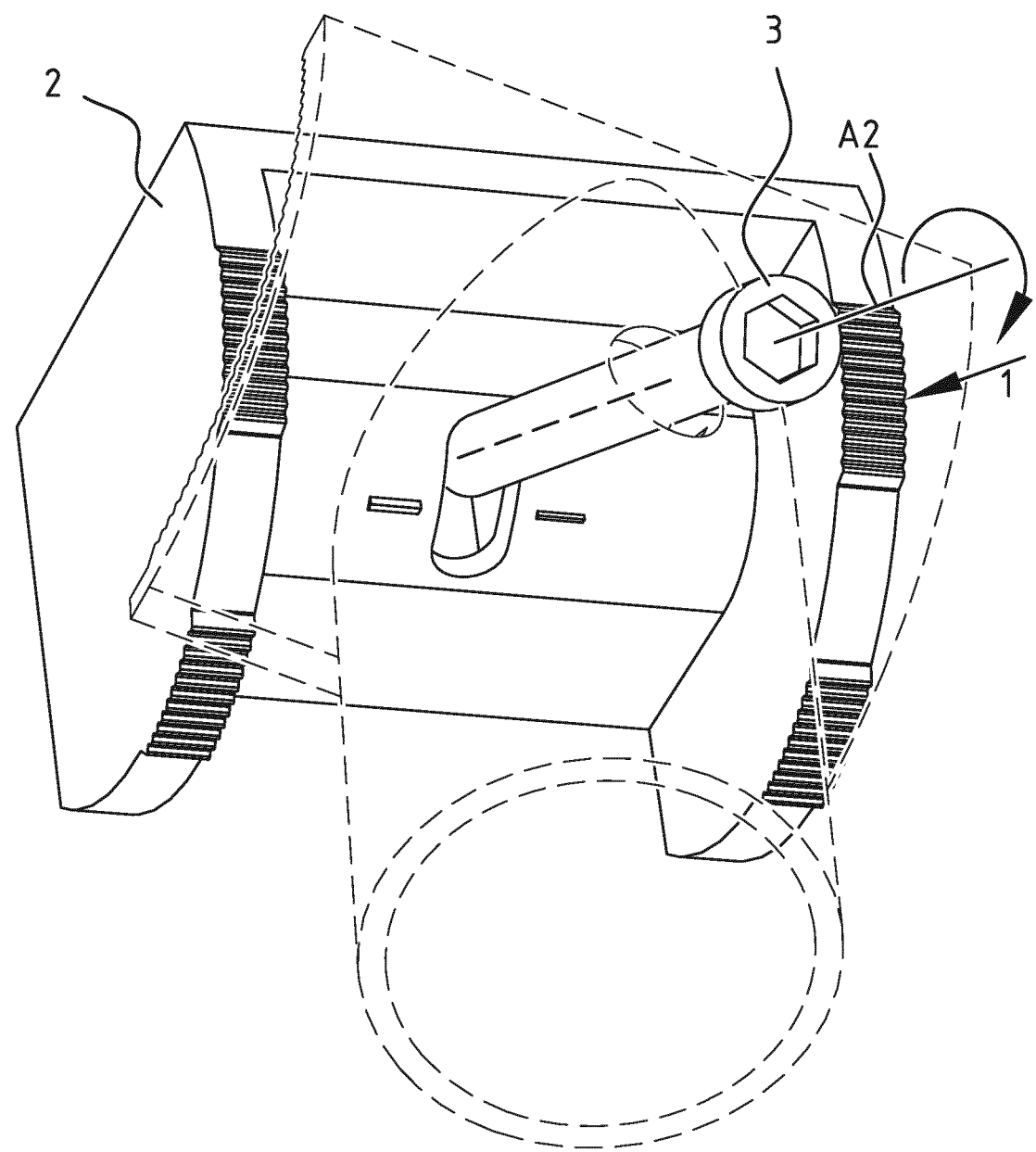
FIG. 6 illustrates an intermediate stage in the rotation from the first state to the second state.

FIG. 6 illustrates the rotation from the first state to the second state, or vice versa. In particular, an intermediate stage is shown, with first element 1 shown only in outline to make clear the respective position of first element 1 and second element 2. In this figure, attaching element 3 is shown, in particular embodied in this instance as a longitudinal bolt. The attaching element 3 may be loosened from tightly attaching the first and second elements 1, 2 in the first position or the second position such that the first element 1 and the second element 2 are movably attached. In the figure, the bolt has been partly pulled back, such that first element 1 and second element 2 can be pulled apart so as to allow rotation of the elements with respect to each other along axis A2, which substantially coincides with the longitudinal axis of attaching element 3. After rotation to the desired position of the first and second positions, the elements can be moved towards each other, in which position their substantially complementary shapes impede any further rotation along A2.

After rotation, the attaching element 3 may be tightened for tightly attaching the first element 1 and the second element 2 in the desired position of the first and second positions. Thus, from the intermediate stage shown in this figure, the attaching element can then be used after completing the 180°-rotation by screwing bolt 3 into a suitable nut (not shown) on the other side of second element 2, to firmly fix first element 1 and second element 2 in the preferred position of the first and second positions. Note that the nut is preferably embodies as a captured nut, such that only the bolt needs to be engaged with by a person controlling the orientation of the elements. This further improves the ease of use of the proposed angle adjustment and rotation system. According to a further embodiment, the nut may be supplemented with a second nut behind said nut, said second nut acting as a counter-nut to further secure the attachment of the first element to the second element via the attaching element.

The skilled person will be aware that the shown embodiment may be modified in many ways while still retaining the above-mentioned advantages.

The invention claimed is:

1. An angle adjustment and rotation system, comprising:
a first element, comprising a first section configured to be attachable to a luminaire stand, said first section being elongated along a first axis, as well as a second section which is substantially straight along a first direction and which has a cross-section in a plane perpendicular to the first direction with a substantially concave inner surface;
a second element, configured to be attachable to a luminaire head, wherein the outer surface of the second element is substantially straight along the first direction and has a cross-section in a plane perpendicular to the first direction with a substantially convex outer surface; and
an attaching element, which attaches the first element to the second element,
wherein this attaching element is configured to have at least a first state in which it tightly attaches the first element to the second element and a second state in which it movably attaches the first element to the second element,
wherein the inner surface of the second section of the first element and the outer surface of the second element are configured such that they are substantially complementary in at least a first and a second position of the second element with respect to the first element, when the attaching element is in the first state,
wherein in the second position the second element is substantially rotated by 180 degrees with respect to the first element as compared to the first position, about a second axis and along a plane including the first direction,
wherein the second axis is perpendicular to the first direction, and
wherein the attaching element is configured such that its second state enables a rotation:
over substantially 180 degrees of the second element with respect to the first element;
substantially along the plane including the first direction; and
about the second axis.

2. The angle adjustment and rotation system according to claim 1, wherein the second element in its first position is oriented at a first angle with respect to the first axis, and the second element in its second position is oriented at a second angle with respect to the first axis.

3. The angle adjustment and rotation system according to claim 1, wherein the attaching element is a longitudinal element, and wherein the longitudinal axis of the attaching element substantially coincides with the second axis.

4. The angle adjustment and rotation system according to claim 3, wherein the attaching element is a central bolt.

5. The angle adjustment and rotation system according to claim 4, wherein the first section of the first element comprises a first opening, wherein the second section of the first element comprises a second opening, and wherein the second element comprises a third opening suitable for passage of the bolt.

6. The angle adjustment and rotation system according to claim 5, wherein the third opening is shaped such that it enables displacement of the bolt in the third opening along only one direction.

7. The angle adjustment and rotation system according to claim 1, wherein at least a part of the inner surface of the second section of the first element and at least a part of the outer surface of the second element are provided with teeth, configured such that in the first state of the attaching element, the teeth of the inner surface of the second section of the first element and the teeth of the outer surface of the second element engage with each other.

8. The angle adjustment and rotation system according to claim 1, wherein the attaching element is configured to further have a third state, in between the first and second states, in which a rotation of the second element with respect to the first element about a third axis, which is parallel to the first direction, is enabled over an angle of less than 45 degrees.

9. The angle adjustment and rotation system according to claim 1, wherein the first axis is perpendicular to the first direction.

10. The angle adjustment and rotation system according to claim 1, wherein the substantially concave inner surface of the second section of the first element is a curved surface, and wherein the substantially convex outer surface of the second element is a complementary curved surface.

11. The angle adjustment and rotation system according to claim 1, wherein the first section of the first element is substantially hollow and that the second section of the first element has at least one opening, such as to allow for the passage of a cable.

12. A luminaire comprising a luminaire head, a luminaire stand, and the angle adjustment and rotation system according to claim 1, wherein the luminaire head is attached to the luminaire stand via the angle adjustment and rotation system.

13. A method of controlling an orientation of a luminaire head connected to a luminaire stand with the angle adjustment and rotation system according to claim 1, comprising rotating the second element with respect to the first element to one of the first position and the second position in order to control the orientation of the luminaire head.

14. The method of claim 13, further comprising, after the rotation, moving the first element and the second element closer together such that further rotation is impeded.

15. The angle adjustment and rotation system according to claim 1, wherein the attaching element comprises a male and a female portion configured to be fastened to each other.

16. A method of controlling an orientation of a luminaire head connected to a luminaire stand, wherein a first element is attached to the luminaire stand, a second element is attached to the luminaire head, and an attaching element attaches the first element to the second element, said method comprising:

loosening the attaching element from tightly attaching the first and second element in a first position such that the first element and the second element are movably attached;

rotating the luminaire head with respect to the luminaire stand from the first position to a second position whilst the first element remains attached with the attaching element to the second element; and tightening the attaching element for tightly attaching the first element and the second element in the second position, wherein in the second position the second element is substantially rotated by 180 degrees with respect to the first element as compared to the first position.

17. The method according to claim 16, wherein the rotation is a rotation about an rotation axis which coincides with a symmetry plane of the luminaire, and/or a rotation axis which substantially coincides with an orientation of the attaching element.

18. The method according to claim 16, further comprising moving the second element at least a first distance away from first element prior to the rotation, wherein the rotation of the luminaire head with respect to the luminaire stand is only possible if the first element and second element are separated by at least this first distance, and moving the second element closer to the first element subsequent to the rotation, such that the distance between the second element and the first element is smaller than the first distance.

19. The method according to claim 16, further comprising a step of further adjusting the orientation of the luminaire head with respect to the luminaire stand by rotating it along an adjustment axis which is perpendicular to the rotation axis, until its orientation is within a certain angle of a desired orientation, wherein preferably this angle is less than 2.5 degrees, preferably less than 1.5 degrees, more preferably less than 1.25 degrees.

20. The method according to claim 19, wherein the adjusting of the orientation of the luminaire head is performed when the first element and the second element are separated by at least a second distance, wherein the adjustment is only possible when the first element and the second element are separated by at least this second distance, and wherein the second distance is smaller than or equal to the first distance, and further comprising moving the second element closer to the first element subsequent to the adjustment step, such that the distance between the second element and the first element is smaller than the second distance.

* * * * *